Patented May 22, 1951

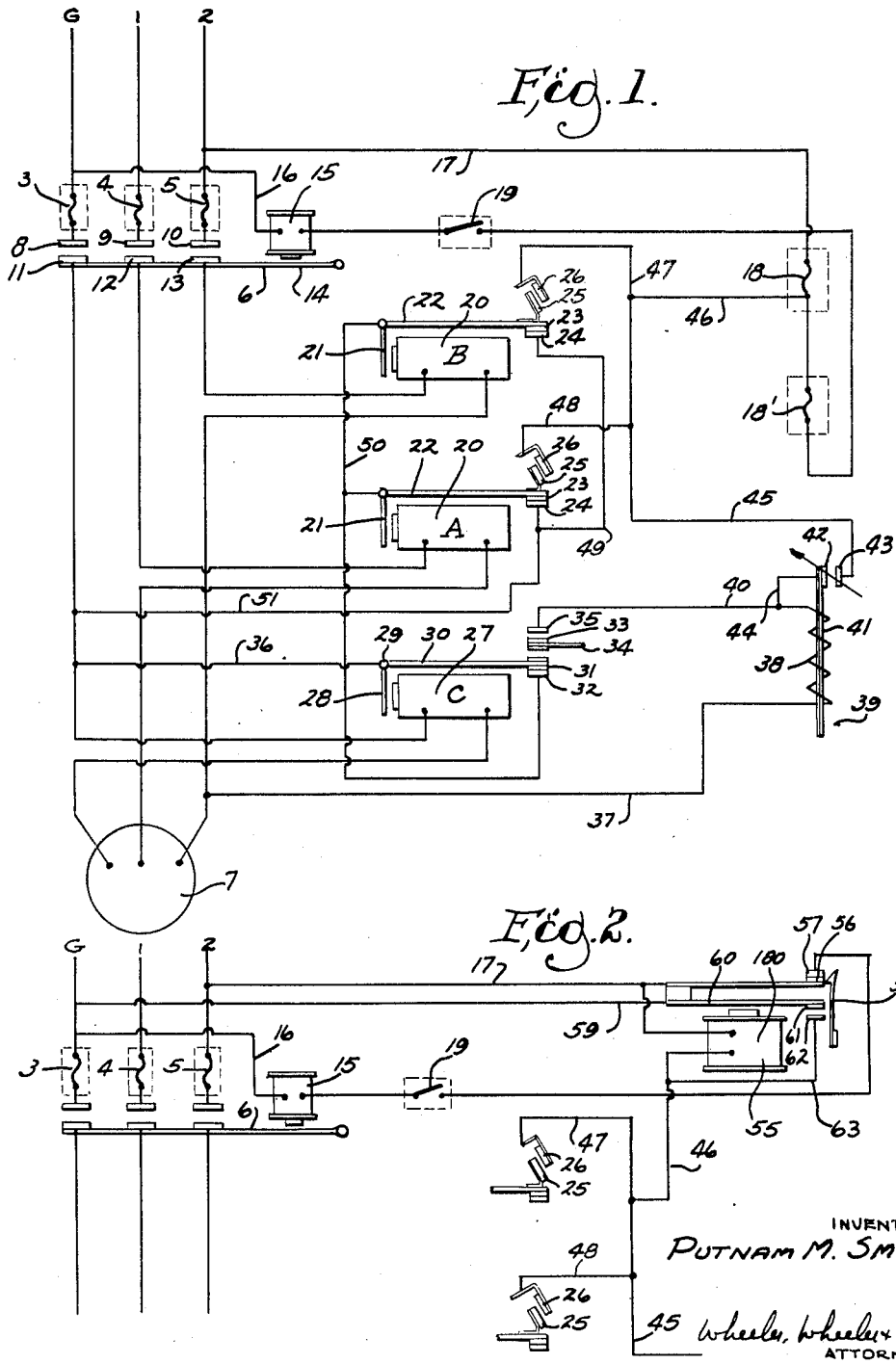

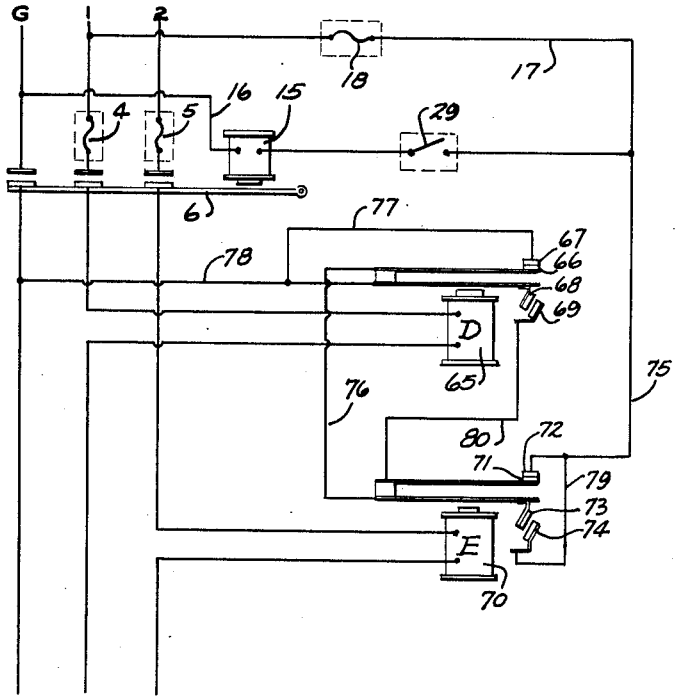
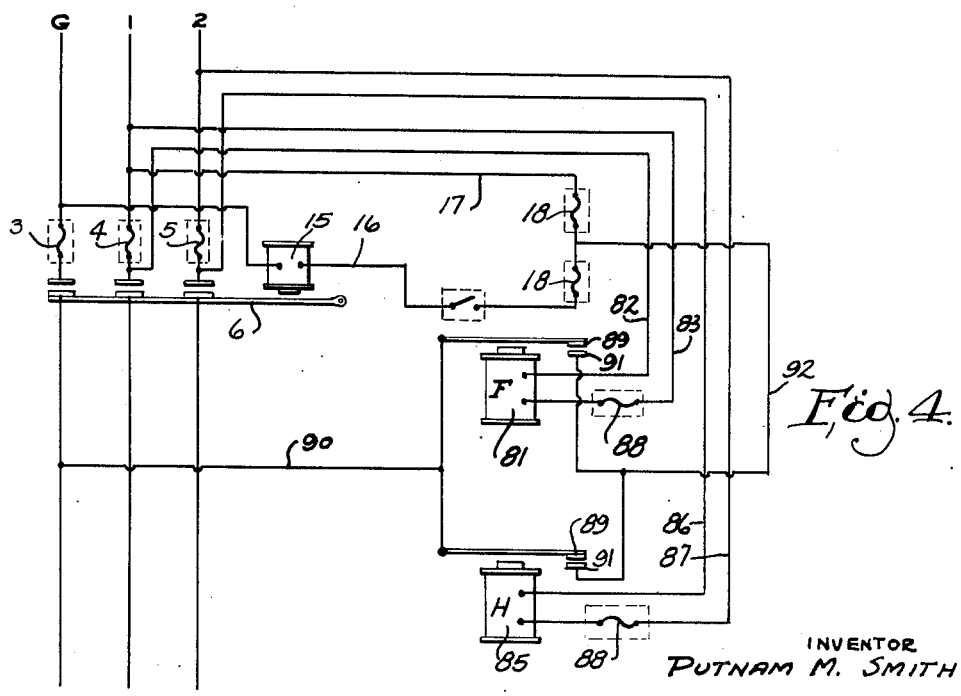

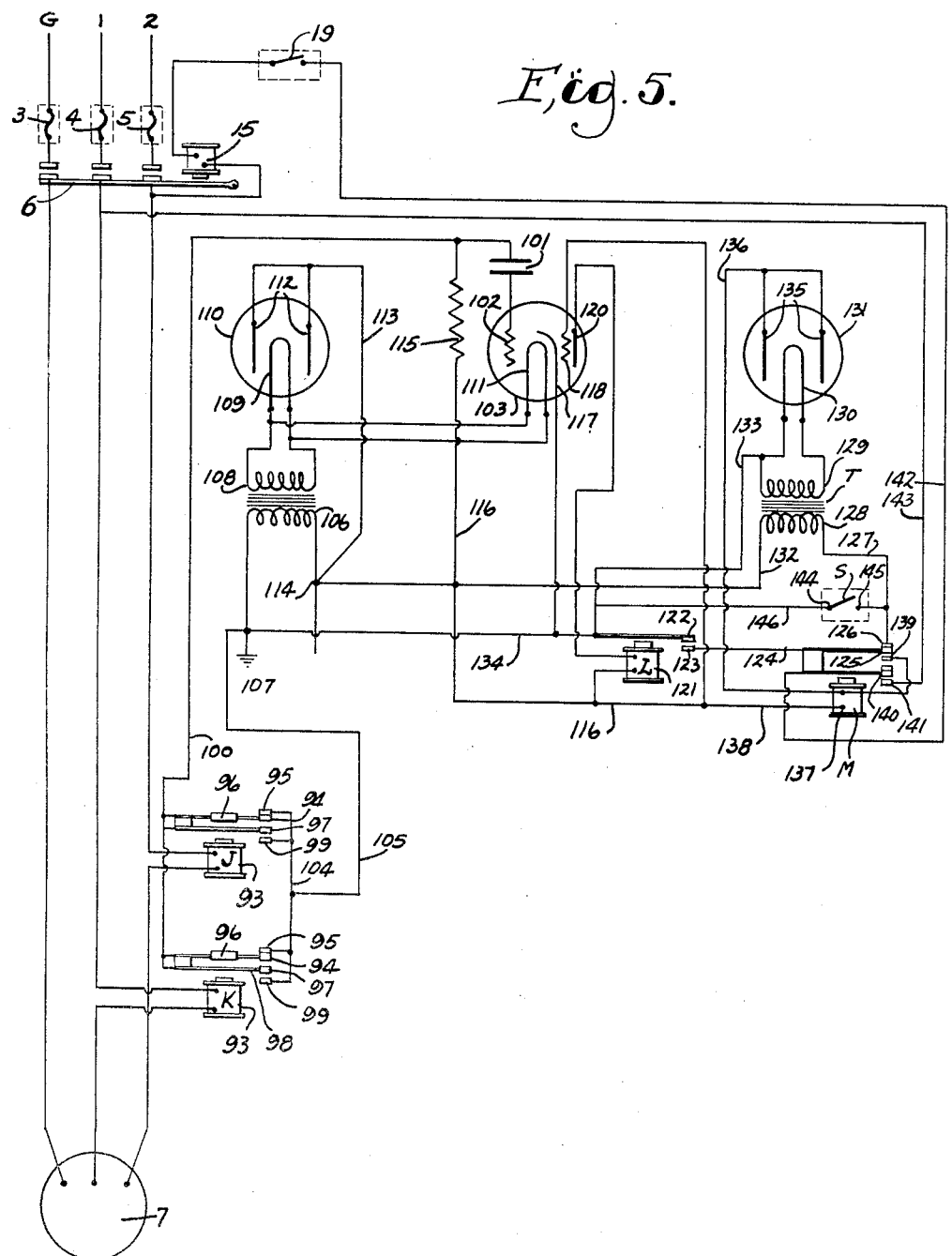

2,553,949

UNITED STATES PATENT OFFICE 2,553,949

CIRCUIT PROTECTING DEVICE FOR MOTORS AND THE LIKE

Putnam M. Smith, Cudahy, Wis., assignor to Screw Machine Products Co., Milwaukee, Wis., a corporation of Wisconsin Application May 9, 1945, Serial No. 592,783

12 Claims. (Cl. 175—294)

This invention relates to improvements in circuit protecting devices for motors and the like. It has particular reference to circuits including three or more phases and a primary object of the invention is to open all lines automatically in the event that anything happens to any one of the hot lines, either in the way of an opening of the circuit or an overload.

It is a further object of the invention to enable the protecting device to function instantly in the event that single phasing occurs, but to allow a predetermined time interval in the event of overload so that such overloads as will not damage the motor may be accommodated without interrupting motor operation.

It is a further object of the invention to employ for the purposes hereof various kinds of protective circuit opening devices such as mechanical relays, electronic relays and fuses, the latter being protected from any normal overload but connected to be deliberately overloaded and blown out in the event of trouble.

There are many devices available for protecting circuits from overload, but in many cases a motor winding may burn out with the safety device operating. If one phase of the motor winding burns out with the motor in operation and without causing the safety device to operate, the motor may continue to run but will completely burn out when the next attempt is made to start it. The same condition would obtain in the event that one of the circuits were to be opened during motor operation for any other cause. It is an objective of the present invention to remedy these difficulties by providing a circuit opening device which will function under all circumstances adversely affecting the safety of the motor whereby the motor will be given full protection.

For certain purposes, it may suffice to provide a device which will only function to protect the motor in the event that one of the circuit phases is opened, irrespective of any question of overload, and whether or not a separate overload control is used.

Another object is to provide a relay device having a novel contact organization adapting the relay to respond sensitively in an alternating current circuit without the high contact pressures and operating magnetism conventionally required for A. C. relays.

In the drawings:

Fig. 1 is a circuit diagram illustrating one embodiment of the invention.

Fig. 2 is a detail view fragmentarily illustrating a modification of the circuit diagram shown in Fig. 1.

Figs. 3, 4 and 5 are circuit diagrams showing further embodiments of the invention.

Throughout the diagrams, the three power lines entering the system are respectively designated G and 1 and 2. The line marked G is the line customarily grounded. In the usual arrangement, each of the lines 1 and 2 will be at approximately 110 volts potential with respect to the line G and 220 volts potential with respect to each other. These lines lead through the main fuses 3, 4 and 5 and the multiple main switch 6 to the main motor or load 7. The main switch 6 is a conventional device comprising stationary contacts 8, 9 and 10 and movable contacts 11, 12 and 13, the latter being mounted on a switch arm 14 which is biased to open position and may be held closed only by the holding coil 15 or the like. In accordance with the present invention, the holding coil is connected by conductor 16 to one of the lines and by conductor 17 to another one of the lines through a circuit opening device which, in Fig. 1, comprises one or more special fuses 18, 18'. To stop the motor 7, a manually operable switch may be employed at any point in this circuit, as indicated at 19.

The current required by the holding coil 15 is nominal. The fuse 18 does not perform the customary function of fuses. While it does protect the holding coil, it is not required for that purpose. It may have a very low rating, such as one ampere. Its real function is to provide a simple, inexpensive and permanent means of opening the holding coil circuit to effect the opening of the main switch 6 in the event that anything goes wrong in the motor or in the lines leading thereto. The manner in which this may be accomplished in the device of Fig. 1 will now be explained.

Connected in series with the line 1 is a magnetic coil 20 of relay A. Its armature 21 has an arm 22 provided with a contact 23 normally closed on contact 24 when the coil is deenergized. A second contact 25 on the arm 22 is engageable with a stationary contact 26 when the coil 20 is energized.

Alternating current relays are subject to vibration in accordance with the alternation of the current. Hence, they normally require considerable spring-loading or considerable electromagnetic pressure to hold them securely closed against arcing. I have discovered that this difficulty may be completely eliminated if the contact surfaces of the respective contacts 25, 26, closed when the coil 20 is energized, are set obliquely with reference to the path of contact movement. I am aware of the fact that switch contacts have previously been set obliquely in order that they may engage and disengage with a wiping operation. The present contacts have that advantage, but they are additionally used in order that the necessary thrust which firmly engages them with each other is effected quite largely in a direction radial with respect to the axis of oscillation of the arm 22 and relatively slightly in a direction at right angles to the radius of oscillation of such arm. As a result, a relatively light pressure in the direction of oscillation will establish a secure and arc-free contact, whereby the switch will open and close with little power notwithstanding the use of A. C. current.

The phase line 2 has a relay B identical with relay A and the parts of which are identified by like reference characters.

The ground line G is also provided with a relay C including a coil 27 in series with the line and provided with an armature 28 pivoted at 29 and provided with an arm 30 carrying a contact 31 normally closed upon stationary contact 32. When the relay 27 is energized, the arm 30 is oscillated into engagement with contact 33 on a spring arm 34 which has no electrical connection and the purpose of which is merely to load the arm 30 against further upward movement during normal operation. In the event of overload, the additional energy developed in coil 27 will enable the armature 28, acting through arm 30, to displace the spring arm 34 sufficiently to close the circuit to the stationary contact 35.

The arm 30 and contact 31 are connected to the ground line G by means of a conductor 36.

Conductor 37 leads from one of the hot lines to the heating resistance 38 of the thermostatic relay 39, such resistance being connected by conductor 40 to the stationary contact 35 of the relay last described. The bimetallic arm 41 of the thermostatic relay carries a contact 42 movable toward engagement with the adjustable contact 43. A branch conductor 44 connects the contact 42 of the bimetallic arm 41 with conductor 40 whereby the contact 42 is grounded to line G when the relay C is energized to close contacts 31, 33 and 35. Contact 43 is connected by conductor 45 to conductor 46 which leads to a point in conductor 17 between the fuses 18, 18' (the fuse 18' may be omitted if desired). Contact 26 of relay B is likewise connected to conductor 46, such connection being effected by a conductor 47. Contact 26 of relay A is connected to conductor 46 through conductor 48 and, if desired, by a portion of conductor 45. Contacts 24 of relays A and B are connected with each other by a conductor 49. The respective arms 22 and contacts 23 and 25 of relays A and B are connected to contact 32 of relay C by means of conductor 50. The contacts 24 of relays A and B are connected to ground by conductor 51. With the main switch 6 open, all three of the relays A, B and C are deenergized and grounded. When the main switch is closed by closing the manually operable control switch 19 to energize the holding coil 15, assuming the several motor circuits to be in good order, all of the relays A, B and C will have their respective coils energized. When all the coils are energized simultaneously, the connection between the ground wire G and conductor 46 will be broken. However, if there is anything wrong with any one of the main line circuits, the respective relay in series with that circuit will fail to function.

If the circuit of line 1 is open and the relay coil 20 of relay A remains deenergized, the circuit remaining effective through contacts 23 and 24 will provide a ground through conductor 51, the arm 22 of relay A, conductor 50, the arm 22 of relay B, contacts 25 and 26, conductor 47 and conductor 46, whereby fuse 18 will be grounded. This will provide a direct short across this fuse, which will immediately blow out, thereby opening the circuit previously existing through such fuse to the holding coil 15. This will immediately open the main switch 6.

If the trouble is in line 2, the relay coil 20 of relay B will remain deenergized and contacts 23 and 24 will remain closed. Thereupon, a ground connection will be established through conductors 51 and 49, contacts 24 and 23 and arm 22 of relay B, conductor 50, arm 22 and contacts 25 and 26 of relay A, and conductors 48, 45 and 46 to the fuse 18, thereby shorting and blowing out this fuse with the result that the holding coil 15 will be deenergized and the main switch 6 will open responsive to its bias.

If the trouble is in the ground line, the coil 27 of relay C will remain deenergized and contacts 31 and 32 thereof will remain closed, thereby completing a ground circuit through conductor 36, the arm 30 and contacts 31 and 32 of relay C, conductor 50, arms 22 and contacts 25 and 26 of both of the relays A and B and conductors 47 and 48 and 46 to blow the fuse 18 and effect opening of switch 6.

In the event there is an overload anywhere in the circuit, it will necessarily manifest itself in the ground line G whereby the relay coil 27 of relay C will be overenergized and the circuit will be closed through contacts 31, 33 and 35 of relay C in the circuit, which includes conductor 37, heating resistance 38, conductor 40 and ground return 36. The resulting heat will ultimately deflect the bimetallic arm 41 to engage contact 42 with contact 43, thereby connecting the ground side of the heating circuit through conductors 45 and 46 to the fuse 18 to short-circuit and blow out such fuse, thereby effecting the opening of the main switch in the manner already described. It will be noted that whereas the opening of the circuit through one of the main lines to single phase the motor will instantly open all circuits to the motor, there will be a certain amount of delay in the functioning of the device in the event of overload. If the overload is not so greatly prolonged as to damage the motor 7, the bimetallic arm 41 will not be heated to such a point as to close the grounding circuit and, in that event, the motor will continue in operation. Only if the overload is of such duration as to render damage to the motor 7 likely, will the overload device function to open all circuits.

Thus, regardless of what may happen to the multiphase circuits, leading to the motor 7 or other load, the circuit-opening device will be operated reliably to effect the complete shut-down of all current to the motor.

Instead of using a fuse at 18 as herein disclosed, I may employ a circuit breaker as suggested in Fig. 2. The connections and operation are essentially the same as with the fuses. The electromagnetic coil 55 of the circuit opening device, may require but little amperage for its operation to withdraw contact 56 from contact 57, thereby opening the circuit to conductor 17 with the holding coil 15 and the main switch 6. In order to hold the circuit open, I may employ a latch device 58 or holding circuit. The latch device will engage the contact 56 when the coil 55 is energized, thereby opening the circuit until the latch device is manually reset. The holding circuit operates through grounding conductor 59, arm 60, contact 61 and stationary contact 62 and conductor 63 and coil 180 to assure a continued ground through the coil from conductor 17 to maintain the coil 55 energized even if the main switch 6 has opened. Either the latch or the holding circuit or both may be used, as desired.

Both of the above devices will function if any of the main fuses 3, 4 or 5 blows out, or if the circuit through any of the lines G or 1 or 2 is opened in any other manner, or if there is any overload in the circuit.

The device shown in Fig. 3 will function if the circuit is opened but is not responsive to overload. With the circuit functioning normally, the coil 65 of relay D is energized, disengaging contact 66 from contact 67 and engaging contact 68 with contact 69. Coil 70 of relay E is also energized, disengaging contact 71 from contact 72 and engaging contact 73 with contact 74. The holding coil 15 is, of course, energized in the manner already described.

If the flow of current beyond fuse 4 through line 1 is interrupted for any reason, coil 65 of relay D will be deenergized, thereby providing a grounding short from line 1 through fuse 18, conductor 17, conductor 75, contacts 74 and 73, conductor 76, contacts 66 and 67 and conductors 77 and 78.

If the circuit through line 2 is interrupted at or beyond the fuse 5, the grounding short-circuit will be established through the fuse 18 by means of conductors 17, 75 and 79, contacts 71 and 72, conductor 80, contacts 68 and 69 and conductor 78.

In either case, the blowing of the fuse 18 will interrupt the circuit through the holding coil 15 to permit the main switch 6 to open in accordance with its bias, thereby interrupting the circuit through all of the lines G, 1 and 2.

The device shown in Fig. 4 is another specialized construction, responsive only to the blowing of one of the main fuses, functioning in the event one of such fuses blows out to open the main switch 6 to interrupt all of the lines G, 1 and 2.

The coil 81 of relay F is connected by conductors 82 and 83 across the fuse 4. The coil 85 of relay H is similarly connected by conductors 86 and 87 across the fuse 5 of line 2. Each of these relays may be protected if desired by its own fuse at 88. The respective contacts 89 of the like relays F and H are connected by conductor 90 to ground, while the coacting contacts 91 are connected by conductor 92 through at least one of the fuses 18 to one of the hot lines outside of its fuse.

The main fuses 4 and 5 respectively short their associated relays F and H, but if either of the main fuses blows out, current will necessarily pass through the corresponding relay energizing its coil to close the circuit controlled by it. In either case, a direct short across the fuse 18 from line 1 to ground is effected through conductors 17, 92 and contacts 91, 89 and conductor 90. Since the circuit through the holding coil 15 is dependent on the fuse 18, which is necessarily blown out as a result of such short, the main switch 6 will immediately open in accordance with its bias.

The embodiment illustrated in Fig. 5 discloses several arrangements which are alternatively usable in the embodiments already described. In the first place, the device shown in Fig. 5 suggests the possibility that the relays whose coils are incorporated in series in the lines may constitute both overload responsive devices and devices responsive to current interruption. In the second place, the construction in Fig. 5 demonstrates the use of electronic relays in place of mechanical relays, or in addition thereto. In the third place, the disclosure of Fig. 5 suggests what is believed to be a completely new use for an electronic tube, namely, the use thereof as a delay action relay which will function according to a change of temperature of its filament. While it is possible to organize the device to delay its response either for the time required to heat or to cool the filament, the particular disclosure is based on the time required for the filament to cool. I have found that the heating and cooling time of the filaments of various tubes is different and, consequently, by selection of an appropriate tube, the period required for response may be varied as desired within a substantial range. A specific construction embodying these suggestions will now be described.

The coil 93 of the relay J is incorporated in series in line 2. The moving contact 94 of this relay is normally biased into engagement with a fixed contact 95 but under normal attraction of the coil 93 for armature 96 the contact 94 will engage contact 97 on a spring arm like that shown in relay K at 98. The elastic resistance of said spring arm, added to that of the armature arm on which contact 94 is mounted, will be sufficient so that under normal load the contact 94 will move no farther. When there is overload in line 1, however, the added attraction of coil 93 will pull contacts 94 and 97 into engagement with the stationary contact 99.

The relay K is identically constructed and connected except that its coil 93 is in series with line 1. The contacts 94 of the respective relays are connected together by a conductor 100 which is connected by a condenser 101 to the grid 102 of an electronic relay tube 103. The contacts 95 and 99 of the respective relays J and K are connected together by a conductor 104 which is connected by conductor 105 to one terminal of a primary 106 of a transformer which may be supplied with the conventional 110 volt A. C. or, properly designed, may be connected across some of the service lines G, 1, 2. While it is not essential, it may be assumed that the terminal 107 is grounded.

The secondary 108 of the transformer operates the filament 109 of the rectifier tube 110 and also the filament 111 of the relay tube 103. The plates 112 of the rectifier are connected by conductor 113 to the terminal 114 of the transformer. The resistance 115 connected from conductor 100 to conductor 116 and thence back to the transformer terminal 114 and the plates 112 of rectifier tube 110 keeps the grid 102 of tube 103 normally positive respecting the filament 111. The cathode 117 of tube 103 is grounded to the primary terminal 107 while the screen grid 118 is connected to the positive conductor 116. The plate 120 of tube 103 is connected through the coil 121 of relay L to the positive conductor 116.

As long as the motor circuit comprising the primary lines G, 1, 2 is functioning satisfactorily, the grid 102 will be positively charged and current will flow between the cathode and plate of the electronic tube 103, thereby energizing coil 121 of relay L. In the event that any one of the phase circuits through lines 1, 2 is open, or in the event that either is overloaded, the relays J, K will provide a connection from the negative terminal 107 to the grid 102, thereby leaving the grid negative and immediately interrupting the electronic flow upon which the relay L is dependent for its energization.

When the relay L is energized, its contact 122 will be engaged with contact 123, the two contacts being normally biased apart. This will complete a circuit through the conductor 124 to contact 125 of relay M and stationary contact 126 of such relay, with which contact 125 is normally engaged. Conductor 127 connects contact 126 with the primary 128 of a transformer T which has a secondary 129 connected across the filament 130 of a time relay electronic tube 131. The other side of the primary 128 of transformer T is connected by conductor 132 to the terminal 114 of the supply transformer previously mentioned.

Like tube 103, the time delay relay tube 131 is supplied with rectified current from tube 110. For this purpose its filament 130 is connected by conductor 133 with the grounded conductor 134 leading from the terminal 107 to contact 122. The plates 135 of tube 131 are connected by conductor 136 to the coil 137 of the relay M which, in turn, is connected by conductor 138 to the conductor 116 which returns to the filament of the rectifier tube 110.

With the tube 131 energized by the heating of its filament 130 by current flowing through the primary 128 of transformer T, as previously described, an electronic current through such tube is established which energizes relay coil 137 of relay M, thereby retracting contact 125 from contact 126 and engaging it with stationary contact 139. The breaking of the circuit between contact 125 and contact 126 deenergizes transformer T and tube 131, but establishes a holding circuit through the contacts 122 and 123 of relay L and contact 139 to the coil 137 of relay M, thus keeping such relay energized.

The energization of relay M also causes engagement of contact 140 with contact 141, these contacts being connected respectively with conductors 142 and 143 which places the holding coil 15 in series between the supply lines 1 and 2, thereby holding the main switch 6 closed.

Any operation of either of the relays J or K, due either to an interruption of service or overload in either of the lines 1 or 2, will, by instantly placing a negative charge on grid 102, result in the immediate deenergization of relayl L, thereby opening the holding circuit for relay M which, in turn, will immediately open the circuit of holding coil 15, thus resulting in the opening of the main switch 6 in accordance with its bias.

For starting purposes I provide a starting switch S having a manually operable contact 144 engageable with the contact 145 which is connected with the conductor 127. The movable contact of the switch S is connected by conductor 146 and conductors 133 and 134 with the transformer terminal 107. Thus, by closing the starting switch S, the primary 128 of the transformer T is immediately energized and set in operation. The starting switch S may be the starting switch with which most conventional motors are provided; or, it may be a separate switch especially for this purpose. In any event, it heats the filament of tube 131 and establishes electronic circuit through tube 131 for energizing coil 137 of relay M independently of any of the other relays.

It may be assumed that there will be overload on the lines 1 and 2 during the starting of the motor. However, since the filament 130 of tube 131 is heated at the outset, and since the time required for it to cool is appreciable, the holding coil 15 will continue to function, notwithstanding the overload.

Before the filament 130 can cool, the motor should be in full operation and the overload consequently eleminated so that the device will continue to function. It will be noted, however, that after the filament 130 of the delay response relay tube 131 has fully cooled, the coil 137 of relay M will thereafter be dependent on its holding circuit and not upon tube 131. Consequently, if overload occurs after the device is fully in operation, the opening of the main switch 6 will be immediate and there will be no time delay.

By other circuits the time required for the filament of an electronic tube to change its temperature may be made effective at all times during operation instead of merely during starting as is the thermostatic relay tube 131. It is also desired to note that in the circuits previously described, the holding coil may be connected between lines 1 and 2 as in Fig. 5, instead of being connected between one of such lines and ground, as previously described.

The electronic tube known commercially as a "type 180" has a filament which requires approximately two seconds to cool, while the tube commercially known as "type 112" requires approximately one and one-half seconds to cool, and a tube of the type commercially known as "171A" requires approximately one second for its filament to cool. Any one of such tubes may be used at 131 in the circuit of Fig. 5, or any other tube of any desired characteristic may be substituted, since this tube does not function in this circuit in any normal manner or in any manner requiring any particular internal organization.

Each of the devices herein disclosed is calculated to completely eliminate the phenomenon of motor operation which is known as "single-phasing," instantly opening all circuits in the event of either single-phasing or overload.

It is desired to comprehend within the scope of the appended claims not only the specific circuits disclosed, but also their well known electrical equivalents.

I claim:

1. The combination with a plurality of electrical supply lines, master switch means biased to open position and controlling all of said lines, a holding coil adapted, when energized, to maintain said switch means closed to complete circuit connections through said lines, and a holding coil circuit for energizing said coil, of a circuit opening device in said holding coil circuit adapted to open said circuit when subjected to overload, a separate actuating circuit for said opening device including a normally open switch and connections between the supply lines and the holding coil circuit subjecting said device to overload when said switch is closed, and means operatively connected to be responsive to abnormal conditions in one of said lines to close said last mentioned switch whereby to subject the circuit opening device to overload and thereby effect the opening of the holding coil circuit, the deenergization of the holding coil, and the opening of the master switch to open all of said lines.

2. For use with a plurality of electrical supply lines, master switch means normally biased to open position and controlling all of such lines, a holding coil for holding said master switch means closed to complete circuit connections through the several lines, and a holding circuit for energizing said holding coil; the combination of a circuit opening device operable in response to overload and connected in said holding coil circuit, conducting means comprising a normally open shorting circuit in which said circuit opening device is also disposed, and a plurality of relay switch means controlling said shorting circuit, and connections between said shorting circuit and said relay switch means whereby the non-concurrent actuation of the relay switch means will close the shorting circuit to overload the circuit opening device and effect the deenergization of the holding coil circuit and the opening of the master switch means, each of said relay means being operatively connected with a separate line aforesaid and responsive to abnormal conditions therein, whereby abnormal conditions in any one of such lines will effect the opening of all thereof.

3. For use with switch means controlling a plurality of lines and a holding coil adapted when energized to hold said switch means closed; an energizing circuit for said holding coil including a protective circuit opening device, means for subjecting said device to overload to effect the circuit opening thereof, whereby to interrupt the circuit to said holding coil, and a relay in connection with one of said lines and provided with switch contacts in series with and controlling said last means.

4. For use with a first electrical circuit for supply of electric current to a load, an overload responsive device in a separate circuit having first circuit connections and means for opening the circuit between said connections and said load, means including an additional circuit connection for overloading such device, and a relay controlling said additional circuit, said relay, when actuated, being adapted to overload said separate circuit connection and said device whereby to cause the first mentioned circuit connections to open.

5. A protective device for a plurality of electrical lines provided with master switch means and a holding circuit therefor, said device comprising a circuit opening device incorporated in said holding circuit and operable responsive to overload, circuit connections between said lines and said holding circuit for subjecting said device to overload independently of at least a part of said holding circuit, said connections comprising relay switches provided with windings having operative connection with individual lines, and means whereby the energization of the winding of any of said relay switches, independently of any other, will establish a circuit through said connections to subject said device to overload and thereby to open said holding circuit.

6. The combination set forth in claim 5 in which the several relay switches are double throw switches provided with terminal connections such that if said switches operate concurrently the circuit through such connections will remain open, whereas if said switches operate individually a circuit through such connections will be established.

7. The combination set forth in claim 5 in which said relay switches comprise contacts connected in parallel whereby the operation of any one thereof will establish a circuit through said connections.

8. A device for opening the holding circuit of a master switch controlling a plurality of phases, said device comprising circuit opening means in said holding circuit and circuit connections between said phases and said holding circuit for the operation of said means including relays having coils operatively connected with individual phases and double throw switches having armatures operable when said coils are energized and contacts for said switches provided with circuit connections to said device, the circuit connections of said contacts being such as to establish a circuit to said device in the event of energization of either of said coils independently of the other whereby to overload said device to break the holding coil circuit, the energization of said relay coils concurrently being adapted to leave said circuit open.

9. The combination with a plurality of electric supply lines, a master switch biased toward open circuit position and controlling flow of current in all of said lines between said switch and a load, a holding coil for maintaining said master switch in circuit closed position and a circuit normally, completely independent of said lines between the master switch and the load for energizing said holding coil, of a device in said holding coil circuit for opening said circuit upon overload thereof, means severally connected with and actuated responsive to abnormal current conditions in said lines, and circuits in which said means are disposed, non-concurrent actuation of said means responsive to abnormal current conditions in less than all of said lines being effective to close said circuits to overload said holding circuit device.

10. The combination with a plurality of electric supply lines, a master switch biased toward open circuit position and controlling flow of current in all of said lines, a holding coil for maintaining said master switch in circuit closed position and a circuit energizing said holding coil, of a device in said holding coil circuit for opening said circuit upon overload thereof, a separate circuit between said lines and said holding coil circuit, relays severally connected in series with said lines, the relays having a plurality of pairs of contacts, one of the pairs of contacts of each relay being connected in said separate circuit effective for imposing an overload on said holding circuit upon energization of said relay in coaction with the deenergization of another of said relays.

11. The combination with a plurality of electric supply lines, a master switch biased toward open circuit position and controlling flow of current in all of said lines, a holding coil for maintaining said master switch in circuit closed position and a circuit energizing said holding coil, of a device in said holding coil circuit for opening said circuit upon overload thereof, means severally connected with and actuated responsive to abnormal current conditions in said lines, circuits between said lines and said holding coil circuit which are closed by said means upon non-concurrent actuation of said means for applying overload on said holding circuit and said device, and a thermally responsive device connected between said lines and said holding circuit for applying an overload to the holding circuit upon flow of excess current in one of said lines for more than a predetermined period.

12. The combination with a polyphase electric supply line including a grounded line, a master switch biased toward circuit open position and controlling flow of current in said line, a holding coil for maintaining said switch in circuit closed position and a circuit for energizing said holding coil, of a device in said holding coil circuit for opening said circuit upon overload thereof, means severally connected with and actuated responsive to abnormal current conditions in said lines, circuits between said lines and said holding coil circuit which are closed by said means upon nonconcurrent actuation of said means for applying overload to said holding circuit and said device, and thermally responsive means connected between the grounded line and an ungrounded line and having a connection with the holding circuit for imposing an overload on the holding circuit upon flow of excess current in said grounded line for more than a predetermined period.

PUTNAM M. SMITH.

REFERENCES CITED

The following references are of record in the file of this patent:

UNITED STATES PATENTS

| Number | Name | Date |
|---|---|---|
| 476,330 | Thompson | June 7, 1892 |
| 792,859 | Sundh et al. | June 20, 1905 |
| 973,322 | Tucker et al. | Oct. 18, 1910 |
| 1,134,752 | Leonard | Apr. 6, 1915 |
| 1,179,637 | Kruse | Apr. 18, 1916 |
| 1,189,409 | Van Alstyne | July 4, 1916 |
| 1,272,432 | Harlow | July 16, 1918 |
| 1,569,147 | Smith | Jan. 12, 1926 |
| 1,652,346 | Burnham | Dec. 13, 1927 |
| 1,800,256 | Keller | Apr. 14, 1931 |
| 1,849,117 | Starr | Mar. 15, 1932 |
| 1,871,875 | Bradford | Aug. 16, 1932 |
| 1,922,452 | Parks | Aug. 15, 1933 |
| 2,256,117 | Keeley | Feb. 12, 1938 |

FOREIGN PATENTS

| Number | Country | Date |
|---|---|---|
| 248,094 | Germany | Nov. 4, 1911 |
| 382,695 | Great Britain | Nov. 3, 1932 |
| 475,130 | Great Britain | Nov. 15, 1937 |